United States Patent Office 3,739,037
Patented June 12, 1973

3,739,037
SYNTHESIS OF UNSATURATED HYDROCARBONS
Norbert F. Cywinski, Odessa, Tex., assignor to
Phillips Petroleum Company
No Drawing. Original application May 14, 1964, Ser. No. 367,581, now Patent No. 3,551,463, dated Dec. 29, 1970. Divided and this application Sept. 8, 1970, Ser. No. 70,477
Int. Cl. C07c *3/08*
U.S. Cl. 260—666 XA        7 Claims

ABSTRACT OF THE DISCLOSURE

Non-conjugated diolefins are produced by reacting acetylenic hydrocarbons with cyclic or acyclic mooolefins.

---

This application is a divisional application of United States application Ser. No. 367,581, filed May 14, 1964, now Pat. No. 3,551,463.

This invention relates to a method of preparing unsaturated hydrocarbons and the product thereof. In one of its aspects, this invention relates to the production of unsaturated organic compounds by reacting an acetylene and an unsaturated organic compound. In another of its aspects, this invention relates to the production of carbonyl compounds having unsaturation gamma to the carbonyl group by reaction of an acetylene and an allyl alcohol or an allylic ester at a suitably elevated temperature and pressure. In another aspect, this invention relates to the production of non-conjugated dienes by reaction of an acetylene and an olefin at a suitably elevated temperature and pressure. In another aspect, this invention relates to a reaction whereby unsaturated aldehydes or ketones having a double bond gamma to the carbonyl group are produced. In another aspect, this invention relates to a process whereby non-conjugated diolefins are produced. In another aspect, this invention relates to certain novel diolefins produced by the method above-described.

The synthesis of aldehydes or ketones having unsaturation alpha to the carbonyl group is readily effected by such processes as chlorination at the alpha position, followed by dehydrochlorination. It is very difficult to obtain aldehydes and ketones having unsaturation farther removed from the carbonyl group than the alpha position. Non-conjugated diolefins are also very difficult to synthesize since they readily isomerize to the conjugated state.

Since aldehydes and ketones are well known intermediates for chemical synthesis and since non-conjugated diolefins are also of interest as intermediates for chemical synthesis as well as being of interest as termonomers for use in ethylene-propylene rubber, it is highly desirable to find a practical method of producing these materials.

It is known to react olefins and acetylene at super ambient temperatures and pressures to produce conjugated diolefins. It is also known, Sauer and Sausen, J. Organic Chemistry, 27 2730 (1962), to react an olefin with an electronegatively substituted acetylene at super ambient temperatures and autogenous pressures.

It has now been found that unsaturated aldehydes, unsaturated ketones and unsaturated hydrocarbons as herein described can be produced by reacting a primary or secondary allylic alcohol or ester thereof or an olefin with an acetylene at a suitably elevated temperature and pressure.

Accordingly, it is an object of this invention to provide a practical method for producing unsaturated hydrocarbons. Another object of this invention is to produce non-conjugated dienes. Yet another object of this invention is to produce aldehydes and ketones having unsaturation gamma to the carbonyl group.

Other aspects, objects and the several advantages of the invention are apparent from a study of this disclosure and the appended claims.

The broad concept of this invention is represented by the following general equation:

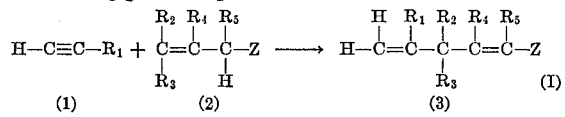

(1)        (2)                    (3)         (I)

where $R_1$ is either hydrogen or lower alkyl and the total number of carbon atoms in $R_1$ is not greater than three; where $R_2$, $R_3$, $R_4$ and $R_5$ are hydrogen or hydrocarbon radicals selected from the group consisting of saturated aliphatic, saturated cycloaliphatic, and aromatic radicals and combinations thereof, and are not necessarily the same, and the number of carbon atoms in each radical does not exceed about 12; where $R_2$ and $R_5$ can be joined to form a 5- or 6-membered cyclic compound when Z is hydrogen; where the total number of carbon atoms present in (2) is not more than 24; and where Z is —H, —OH,

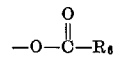

where $R_6$ is a radical as defined above for $R_2$–$R_5$. The general formula stated above is clearly applicable to at least one material selected from the group consisting of cyclic and acyclic olefins, allylic alcohols and allylic esters. Consideration of the general reaction as illustrated by Equation I indicates that the portion of reactant (2) represented by Z has little if any influence on the initial reaction, and therefore, that Z can optionally be any non-reacting non-directing radical, such as amine, amide, substituted amine, and the like.

More specifically, according to this invention, unsaturated aldehydes or ketones having a double bond gamma to the carbonyl group can be synthesized by the addition of an acetylene to a primary or secondary allylic alcohol, accompanied by allylic rearrangement of the alcohol to the enol form of the aldehyde or ketone, and followed by rearrangement to the aldehyde or ketone or by the addition of an acetylene to the ester of a primary or secondary allyl alcohol followed by hydrolysis of the reaction product and rearrangement of the hydrolyzed reaction product to said aldehyde or ketone. The general equations for the reaction of an acetylene with the allylic alcohol or ester are:

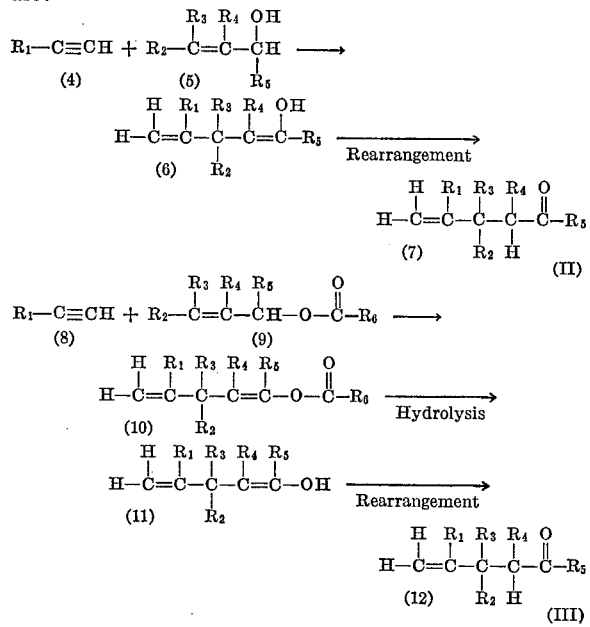

where $R_1$, $R_2$, $R_3$, $R_4$, $R_5$ and $R_6$ are as defined above.

The reaction is highly selective and the desired addition product is usually isolated by distillation. If an ester is used as a reactant, the product isolation can be effected either before or after hydrolysis of the reaction product of the acetylene and the ester. Major side reactions are thermal decomposition of the acetylene to produce carbon, and production of higher molecular weight compounds. These side reactions can be minimized by proper control of the ratio of reactants and the reaction conditions.

Also in accordance with this invention and as illustrated in Equation I, with Z equal to hydrogen or a hydrocarbon radical, non-conjugated dienes, for example, 1,4-diolefins, can be synthesized by the allylic addition of cyclic or acyclic olefins and acetylenes at an elevated temperature and an elevated pressure. The process of this invention requires no catalysts or initiators. The addition reaction is carried out simply by heating the reactants at a temperature of about 200 to about 600° C., preferably about 300 to about 400° C., at a pressure of about 250 to about 50,000 p.s.i.g., preferably about 500 to about 25,000 p.s.i.g., still more preferably about 1,000 to about 5,000 p.s.i.g., and for a contact time of about 1 second to about 120 minutes, preferably about 1 to about 60 minutes, more preferably about 6 to about 40 minutes. The reaction is conveniently carried out by dissolving the acetylene in the second reactant and pumping the mixture through a reactor heated to the desired temperature. The reaction can be carried out as a batch, a continuous or a semi-continuous process. In a continuous process, the indicated contact times correspond to liquid hourly space velocities (LHSV) of about 0.5 to about 3600, preferably about 1 to about 60, more preferably about 1.5 to about 10 volumes of liquid per volume reactor space per hour. The acetylene will usually comprise from 1 to 30, preferably 5 to 15, weight percent of the total reactants.

The acetylenic compounds or materials that can be employed according to this invention are the 1-acetylenes containing from 2 to 5 carbon atoms and include acetylene, 1-propyne, 1-butyne, 1-pentyne, and 3-methyl-1-butyne and mixtures thereof. The usual precautions for handling acetylene under pressure should be observed. Explosions can be prevented in handling acetylene under pressure by dilution with other gases (nitrogen, methane, etc.), operating with limited free space in the lines and vessels in which acetylene is under pressure, and other means known in the art for handling acetylene.

The alcohols that can be employed according to this invention include primary and secondary alcohols containing from 3–24 carbon atoms, for example:

propen-1-ol-3 (allyl alcohol),
2-methylpenten-2-ol-4, hexen-4-ol-6,
3,3,7-trimethyl-4-ethyl-5-cyclohexylocten-4-ol-6,
2-phenyl-3-methyl-4-(1-naphthyl)-hexen-3-ol-5,
3-isobutyl-6-cyclohexyl-8-phenylocten-6-ol-8,
5-(2,5-dimethylcyclohexyl)-7-(4-methylphenyl)hepten-5-ol-7,
2-methylpenten-2-ol-4, 4-isobutyl-5-cyclohexylhexen-4-ol-6,
2-methyl-4-ethyl-5-phenylnonen-4-ol-6,
and the like.

The esters that can be employed according to this invention include esters containing from 4–24 carbon atoms, for example: the formic acid ester of propen-1-ol-3, the acetic acid ester of buten-1-ol-3, the cyclobutanecarboxylic acid ester of 3-benzyl-4-ethylocten-3-ol-5, the lauric acid ester of 2-methyl-4-cyclohexylpenten-3-ol-5, the benzoic acid ester of 2-methylhepten-4-ol-6, the cyclohexaneacetic acid ester of 2-methyl-5-cyclopentylpenten-2-ol-4, the 2-naphthoic acid ester of 8-methylenenonanol-9, the gamma-cyclopentaneoctanoic acid ester of 1-cyclohexyl-2,3-dimethylpropen-1-ol-3, the beta-3-ethylbenzenebutyric acid ester of 6-n-pentylhepten-5-ol-7, the 4-n-butylcyclohexanecarboxylic acid ester of decen-3-ol-5, and the like.

The olefins that can be employed according to this invention include cyclic and acyclic monoolefins containing from 3–24 carbon atoms, for example: propylene, isobutylene, butene-1, cis-butene-2, trans-butene-2, pentene-2, 2-methylbutene-1, 3-methylbutene-1, 2-methylbutene-2, cyclohexene, 4-methylpentene-1, trans-4-methylpentene-2, 2,3-dimethylbutene-1, 2,3 - dimethylbutene - 2, 2,4,4-trimethylpentene - 1,3 - cyclohexyl-4-isopropylnonene-3, 2-cyclopentyl - 5 - phenylpentene - 2,3 - (2 - naphthyl)-4-(3 - ethylcyclohexyl)hexene-3, 1,3-di-n-butylcyclopentene-1,2 - phenylcyclohexene-1, 4-(3,4 - dimethylcyclohexyl) cyclohexene-1, and the like.

The aldehydes produced by this invention include: penten-1-al, 4-vinylhexanal, 8-allylnonanal, 5-vinyl-6-n-pentylheptanal, 2 - methyl-3-vinyl-4-cyclohexylpentanal, and the like.

The ketones produced by this invention include:

2,2,4-trimethylhexen-1-one-5,
3,3,7-trimethyl-4-ethyl-4-vinyl-5-cyclohexyloctanone-6,
3,3-dimethylhexen-1-one-5,
3-isobutyl-6-vinyl-6-cyclohexyl-8-phenyloctanone-8,
hexen-1-one-5, and the like.

The dienes produced by this invention include cyclic and acyclic diolefins containing from 5–29 carbon atoms, for example:

2-methyl-1,4-pentadiene,
cis-1,4-hexadiene,
trans-1,4-hexadiene,
3-methyl-1,4-pentadiene,
3-methyl-1,4-hexadiene,
3-ethyl-1,4-pentadiene,
cis-4-methyl-1,4-hexadiene,
trans-4-methyl-1,4-hexadiene,
2-ethyl-1,4-pentadiene,
5-methyl-1,4-hexadiene,
2,3-dimethyl-1,4-pentadiene,
3,3-dimethyl-1,4-pentadiene,
3-vinylcyclohexene,
6-methyl-1,4-heptadiene,
3,5-dimethyl-1,4-hexadiene,
3-isopropyl-1,4-pentadiene,
4,5-dimethyl-1,4-hexadiene,
2-isopropyl-1,4-pentadiene,
2,3,3-trimethyl-1,4-pentadiene,
2-neopentyl-1,4-pentadiene,
4,6,6-trimethyl-1,4-heptadiene,
2,6,6-trimethyl-1,4-heptadiene,
2-tert-butyl-1,4-hexadiene,
4,5-dimethyl-1,4-hexadiene, and the like.

The products listed above are prepared from certain of the alcohols, esters, and olefins listed previously by reaction with acetylene. If a higher acetylene is used, products such as hepten-4-al, 6-methylhepten - 4 - al, octen-5-one-2, 4-methyl-2,5-octadiene, 1-phenyl-4-cyclopentyl-2,5-octadiene, and the like, are obtained.

It should be noted that any one of the acetylenes encompassed by the above disclosure can be reacted with any one of the alcohols, esters and olefins also encompassed within the above disclosure to produce the materials contemplated by this inveniton. For example, the same acetylenic material can be used to react with butene-1 to produce 1,4-hexadiene, to react with allyl alcohol to produce penten-1-al, and to react with an acetic acid ester of buten-1-ol-3 to yield hexen-1-one-5. Mixtures of the above named reactants can also be employed in the practice of this invention.

EXAMPLE I

A one-liter bomb containing 473 ml. of allyl alcohol was cooled to 0° C. and the alcohol was saturated with acetylene at a pressure of 60 p.s.i.a. The resulting solution was pumped through a metal reactor heated to 350° C. at 3.5 LHSV and 2,500 p.s.i.g. Unreacted acetylene was vented from the product and the product was distilled. A 6 percent yield of 4-penten-1-al based on the alcohol charged was obtained.

EXAMPLE II

A reaction was conducted in the same manner and under the same conditions used in Example I, using acetylene and the acetic acid ester of buten-1-ol-3 as reactants. The effluent was distilled and the eser obtained was hydrolyzed to obtain hexen-1-one-5. A good yield was obtained.

From Examples I and II, it can be seen that a practical method of producing the desired unsaturated aldehydes and ketones is presented by this invention.

EXAMPLE III

In this example, acetylene was pressured into a feed tank containing the olefin to give the indicated acetylene concentration, and the mixture was pumped through a stainless-steel pipe reactor under the indicated conditions to give the indicated yield of 1,4-diolefin product.

Yield of 1,4-diolefin was determined either by distillation or gas chromatography analysis of the product. Identification of the 1,4-diolefin was done by infrared or NMR (nuclear magnetic resonance) spectroscopy.

The data for this example are shown in Table I.

which comprises contacting a 1-alkyne of the formula H—C≡C—$R_1$ having from 2 to 5 carbon atoms, wherein $R_1$ is hydrogen or lower alkyl with up to 3 carbon atoms per $R_1$, with an olefin of the formula

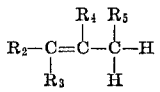

having up to 24 carbon atoms wherein $R_2$, $R_3$, $R_4$, and $R_5$ are hydrogen or hydrocarbon radicals containing up to 12 carbon atoms per radical and said radical is individually selected from the group consisting of saturated aliphatic, saturated cycloaliphatic, aromatic, and combinations thereof, and wherein $R_2$ and $R_5$ can form a 5- or 6-membered cyclic compound, within a reaction vessel in which the surface which is in contact with the reactants is stainless steel at a temperature ranging from about 200 to about 600 C. and a pressure above about 1,000 p.s.i.g. sufficient to produce a non-conjugated diolefin of the formula

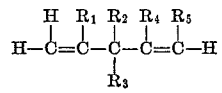

wherein $R_1$, $R_2$, $R_3$, $R_4$, and $R_5$ are as defined above.

TABLE I

| Run No. | Temp., °C. | Pressure, p.s.i.g. | $C_2H_2$ in feed, wt. percent | Olefin used | Total Hyc, LHSV [a] | Diolefin made | Diolefin yield, wt. percent of product |
|---|---|---|---|---|---|---|---|
| 1 | 355 | 2,500 | 10.6 | Isobutylene | 2.1 | 2,methyl-1,4-pentadiene | 4.5 |
| 2 | 358 | 1,800 | 11.0 | do | 1.5 | do | 3.0 |
| 3 | 355 | 2,500 | 14.0 | do | 2.1 | do | 4.4 |
| 4 | 350 | 2,500 | 8.6 | do | 1.9 | do | 3.4 |
| 5 | 338 | 2,500 | 7.4 | do | 1.5 | do | 2.7 |
| 6 | 358 | 2,500 | 8.5 | Butene-1 | 1.6 | 1,4-hexadiene: cis | 1.2 |
|   |   |   |   |   |   | 1,4-hexadiene: trans | 1.6 |
| 7 | 358 | 2,500 | 8.5 | cis-Butene-2 | 1.6 | 3-methyl-1,4-pentadiene | 0.9 |
| 8 | 358 | 2,500 | 8.5 | trans-Butene-2 | 1.6 | do | 2.3 |
| 9 | 350 | 2,500 | 10 | Pentene-2 | 3.5 | 3-methyl-1,4-hexadiene | 2.9 |
|   |   |   |   |   |   | 3-ethyl-1,4-pentadiene | 1.1 |
| 10 | 355 | 2,500 | 10 | 2-methylbutene-1 | 4.2 | 4-methyl-1,4-hexadiene: cis | 2.5 |
|   |   |   |   |   |   | 4-methyl-1,4-hexadiene: trans | 2.5 |
|   |   |   |   |   |   | 2-ethyl-1,4-pentadiene | 3.0 |
| 11 | 350 | 2,500 | 10 | 3-methylbutene-1 | 3.0 | 5-methyl-1,4-hexadiene | 3.0 |
| 12 | 360 | 2,500 | 10 | 2-methylbutene-2 | 3.5 | do | 1.2 |
|   |   |   |   |   |   | 2,3-dimethyl-1,4-pentadiene | 6.0 |
|   |   |   |   |   |   | do | 0.6 |
| 13 | 355 | 2,500 | 10 | Cyclohexene | 4.2 | 3-vinylcyclohexene | 3.6 |
| 14 | 360 | 2,500 | 10 | 4-methylpenetne-1 | 3.5 | 6-methyl-1,4-heptadiene | 5.0 |
| 15 | 350 | 2,500 | 10 | trans-4-methylpentene-2 | 3.5 | 3,5-dimethyl-1,4-hexadiene | 4.6 |
|   |   |   |   |   |   | 3-isopropyl-1,4-pentadiene | 1.5 |
| 16 | 355 | 2,500 | 10 | 2,3-dimethylbutene-1 | 3.5 | 4,5-dimethyl-1,4-hexadiene | 3.1 |
|   |   |   |   |   |   | 2-isopropyl-1,4-pentadiene | 3.9 |
| 17 | 355 | 2,500 | 10 | 2,3-dimethylbutene-2 | 4.6 | 4,5-dimethyl-1,4-hexadiene | 1.9 |
|   |   |   |   |   |   | 2,3,3-trimethyl-1,4-pentadiene | 5.4 |
| 18 | 350 | 2,500 | 10 | 2,4,4-trimethylpentene-1 | 3.9 | 2-neopentyl-1,4-pentadiene | 4.4 |
|   |   |   |   |   |   | 4,6,6-trimethyl-1,4-heptadiene | 1.6 |
|   |   |   |   |   |   | 2,6,6-trimethyl-1,4-heptadiene or 2-tert-butyl-1,4-hexadiene [b] | 3.0 |

[a] These are approximate figures because of the presence of acetylene in the olefin feed.
[b] It was not possible to decide between these two with the MNR and infrared spectroscopic data available.

From Example III, it can be seen that cyclic and acyclic non-conjugated diolefins are readily prepared by this invention.

Reasonable variation and modification are possible within the scope of the foregoing disclosure, and the appended claims to the invention, the essence of which is that there have been provided a method for synthesizing an unsaturated aldehyde or ketone having a double bond gamma to the carbonyl groups by the addition of an acetylene to a primary or secondary allylic alcohol or ester thereof followed by hydrolysis, and a method for producing a non-conjugated diolefin by the allylic addition of cyclic or acyclic olefins and acetylenes, all of which reactions are conducted at a suitably elevated temperature and an elevated pressure.

I claim:

1. A method of preparing a non-conjugated diolefin by allylic addition of cyclic or acyclic olefins to acetylenes 2. A method according to claim 1 wherein said temperature is from about 300 to about 400 C. and said pressure is about 1000 to about 5000 p.s.i.g.

3. A method according to claim 2 wherein said contacting is carried out under conditions in which said 1-alkyne is dissolved in said olefin prior to heating to said temperature.

4. The process according to claim 3 wherein said 1-alkyne comprises from 1 to 30 weight percent of the total reactant.

5. The process according to claim 4 wherein said contacting is conducted within a time of from 1 to 60 minutes.

6. A method according to claim 1 wherein said olefin is selected from isobutylene, butene-1, cis-butene-2, trans-butene-2, pentene-2, 2-methyl-butene-1, 3-methylbutene-1, 2-methylbutene - 2, cyclohexene, 4 - methylpentene - 1, trans-4-methylpentene-2, 2,3 - dimethylbutene - 1, 2,3 - dimethylbutene-2, and 2,4,4-trimethylpentene-1.

7. The process according to claim 6 wherein said 1-alkyne is acetylene.

References Cited

UNITED STATES PATENTS

| | | | |
|---|---|---|---|
| 3,352,937 | 11/1967 | Chini et al. | 260—680 |
| 1,868,127 | 7/1932 | Winkler et al. | 260—680 |
| 1,436,819 | 11/1922 | Plauson | 260—680 |
| 2,197,257 | 4/1940 | Burk | 260—680 |
| 2,357,926 | 9/1944 | Bannon | 260—680 |

PAUL M. COUGHLAN, Jr., Primary Examiner

U.S. Cl. X.R.

260—668 R, 680 R